(12) United States Patent
Ohta

(10) Patent No.: US 9,162,607 B2
(45) Date of Patent: Oct. 20, 2015

(54) VEHICULAR LAMP

(71) Applicant: KOITO MANUFACTURING CO., LTD., Tokyo (JP)

(72) Inventor: Shinji Ohta, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/561,829

(22) Filed: Dec. 5, 2014

(65) Prior Publication Data

US 2015/0158414 A1    Jun. 11, 2015

(30) Foreign Application Priority Data

Dec. 6, 2013  (JP) ................................. 2013-252846

(51) Int. Cl.
*H05B 37/02* (2006.01)
*B60Q 1/00* (2006.01)

(52) U.S. Cl.
CPC ........................................ *B60Q 1/00* (2013.01)

(58) Field of Classification Search
USPC ....... 315/307, 308, 185 R, 192, 193, 291, 77, 315/82
See application file for complete search history.

(56) References Cited

U.S. PATENT DOCUMENTS

| 7,042,165 | B2* | 5/2006 | Madhani et al. .......... 315/185 R |
| 7,880,401 | B2 | 2/2011 | Kitagawa et al. | |
| 2010/0308743 | A1* | 12/2010 | Liang et al. .................. 315/253 |
| 2011/0025217 | A1* | 2/2011 | Zhan et al. .................... 315/219 |

FOREIGN PATENT DOCUMENTS

JP    2009-035105 A    2/2009

\* cited by examiner

*Primary Examiner* — David H Vu
(74) *Attorney, Agent, or Firm* — Osha Liang LLP

(57) ABSTRACT

A vehicular lamp has a light-emitting portion connected in series to an input terminal to which a power supply voltage based on an on-board battery is configured to be applied, and having a plurality of light-emitting elements connected in series, a series connection circuit having a first current limiting resistor and a second current limiting resistor, which is inserted in series between the input terminal and the light-emitting portion, a resistor switching switch connected in parallel to one of the first current limiting resistor and the second current limiting resistor, bypass switches, each of which is connected in parallel to a required one of the light-emitting elements in the light-emitting portion, and a control circuit that turns off the resistor switching switch when at least one of the bypass switches is turned on.

9 Claims, 3 Drawing Sheets

FIG. 2

| LIGHTING MODE | LIGHT-EMITTING ELEMENTS |
|---|---|
| FOG | L1, L3 |
| CORNERING | L1, L2 |
| FOG & CORNERING | L1, L2, L3 |

FIG. 3

| TYPE OF SW / LIGHTING MODE | SW1 | SW2 | SW3 | SW4 |
|---|---|---|---|---|
| ALL OFF | OFF | OFF | OFF | OFF |
| FOG | ON | OFF | ON | OFF |
| CORNERING | ON | OFF | OFF | ON |
| FOG & CORNERING | ON | ON | OFF | OFF |

VEHICULAR LAMP

BACKGROUND

1. Technical Field

The present invention relates to a technical field of vehicular lamps capable of independently lighting/extinguishing a required one of a plurality of light-emitting elements by a bypass switch.

Patent Document 1

Japanese Patent Application Laid-Open (Kokai) No. 2009-35105

2. Related Art

For example, vehicular lamps are known which include a plurality of semiconductor light-emitting elements such as light-emitting diodes. Such vehicular lamps include a vehicular lamp capable of independently driving a required one of the plurality of semiconductor light-emitting elements to emit light. For example, FIG. 5 of Patent Document 1 discloses a configuration capable of independently lighting/extinguishing each light-emitting element by turning on/off bypass switches connected in parallel to the semiconductor light-emitting elements. Patent Document 1 discloses that only a required one of the plurality of bypass switches is driven by PWM to drive the light-emitting element having connected thereto the bypass switch that is driven by PWM and the other light-emitting elements with different driving current values (average current values).

SUMMARY

A required one of the plurality of light-emitting elements can be independently lit/extinguished by using the bypass switches as described above. For example, it is assumed that three semiconductor light-emitting elements are provided, and only one of the three semiconductor light-emitting elements is provided with a bypass switch. In this case, only the semiconductor light-emitting element having this bypass switch connected thereto can be extinguished and the other semiconductor light-emitting elements can be lit by turning on the bypass switch, and all of the three semiconductor light-emitting elements can be lit by turning off the bypass switch.

However, in the case of independently lighting/extinguishing a required one of the plurality of semiconductor light-emitting elements by using the bypass switch, the driving current value of the semiconductor light-emitting elements varies between when the bypass switch is on and when the bypass switch is off. That is, based on the driving current value in the state where all the semiconductor light-emitting elements are lit by turning off the bypass switch, the driving current value is increased in the case where only the required semiconductor light-emitting element is lit by turning on the bypass switch. As a result, the amount of light emission of the light-emitting elements varies depending on whether the bypass switch is on or off.

A DC-to-DC converter that produces an output voltage to the light-emitting elements based on an input voltage, and a feedback control circuit that detects a driving current value of the light-emitting elements and controls a switching operation of a switching element of the DC-to-DC converter so that the detected driving current value matches a predetermined reference value (i.e., performs constant current control of the driving current) can be provided in order to prevent such a variation in driving current value according to on/off of the bypass switch. However, such a configuration increases the number of circuit parts, and is not desirable for reducing cost.

A vehicular lamp according to one or more embodiments of the present invention is capable of maintaining a constant amount of light emission of light-emitting elements regardless of on/off of a bypass switch, while achieving reduction in cost.

According to one or more embodiments of the present invention, a vehicular lamp includes: a light-emitting portion connected in series to an input terminal to which a power supply voltage based on an on-board battery is applied, and having a plurality of light-emitting elements connected in series; a series connection circuit of a first current limiting resistor and a second current limiting resistor, which is inserted in series between the input terminal and the light-emitting portion; a resistor switching switch connected in parallel to one of the first current limiting resistor and the second current limiting resistor; bypass switches each connected in parallel to a required one of the light-emitting elements in the light-emitting portion; and a control circuit that turns off the resistor switching switch when at least one of the bypass switches is turned on.

A resistance value to a driving current increases in the case where the bypass switch is turned on and current consumption of the light-emitting portion decreases.

According to one or more embodiments of the present invention, in a vehicular lamp, the light-emitting portion is a light-emitting portion that lights both of two kinds of lamps having different functions, and have three of the light-emitting elements, one of the three light-emitting elements being a shared element that is lit when lighting the lamps of each function, and the other two being dedicated elements each of which is lit only when lighting the lamp of a corresponding one of the functions, a first bypass switch and a second bypass switch be provided as the bypass switches, the first bypass switch being connected in parallel to one of the dedicated elements, and the second bypass switch being connected in parallel to the other dedicated element, and the control circuit turn off the resistor switching switch when both the first bypass switch and the second bypass switch are turned on.

As described above, the light-emitting portion is the light-emitting portion for both of the two kinds of lamps having the different functions, and the bypass switches are respectively connected in parallel to the dedicated elements other than the shared element. Accordingly, separate driving circuits that independently supply the driving current need not be provided for the lamps of each function in order to independently control lighting/extinguishing of the two kinds of lamps having different functions. Since the resistance switching switch is turned off when both the first bypass switch and the second bypass switch are turned on, a resistance vale to the driving current is increased in the case where current consumption of the light-emitting portion decreases.

According to one or more embodiments of the present invention, a vehicular lamp includes: a main switch inserted in series between the input terminal and the light-emitting portion, wherein the control circuit has a temperature derating portion that drives the main switch by PWM based on a temperature detection result.

Temperature derating is thus implemented in a simple configuration in which a switching regulator that generates an output voltage to the light-emitting portion based on the power supply voltage is omitted.

According to one or more embodiments of the present invention, in a vehicular lamp, the control circuit controls, based on an input to a power supply line to which the power supply voltage is supplied when lighting one of the two kinds of lamps having the different functions, the bypass switch connected in parallel to the dedicated element for the one lamp and the resistor switching switch.

Accordingly, for the one lamp, a control signal as a lighting/extinguishing command need not be input separately from the power supply voltage.

According to one or more embodiments of the present invention, in a vehicular lamp, one of the two kinds of lamps having the different functions is a fog lamp, and the other is a cornering lamp, and the light-emitting elements are semiconductor light-emitting elements.

Accordingly, control of increasing the resistance value to the driving current when the bypass switch is turned on is implemented in the vehicular lamp capable of independently controlling lighting/extinguishing of the fog lamp and the cornering lamp by on/off of the bypass switches. Moreover, the semiconductor light-emitting elements such as, e.g., light-emitting diodes are used as the light-emitting elements L. This is advantageous for reducing the mounting size of the light-emitting elements.

According to one or more embodiments of the present invention, a vehicular lamp capable of maintaining a constant amount of light emission of light-emitting elements regardless of on/off of a bypass switch can be implemented while achieving reduction in cost.

BRIEF DESCRIPTION OF THE DRAWINGS

FIG. 2 is a diagram showing the correspondence between the lighting mode of a light-emitting portion and light-emitting elements to be lit.

FIG. 3 is a diagram showing the correspondence between the lighting mode of the light-emitting portion and the on/off state of each switch.

DETAILED DESCRIPTION

Embodiments of the present invention will be described with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
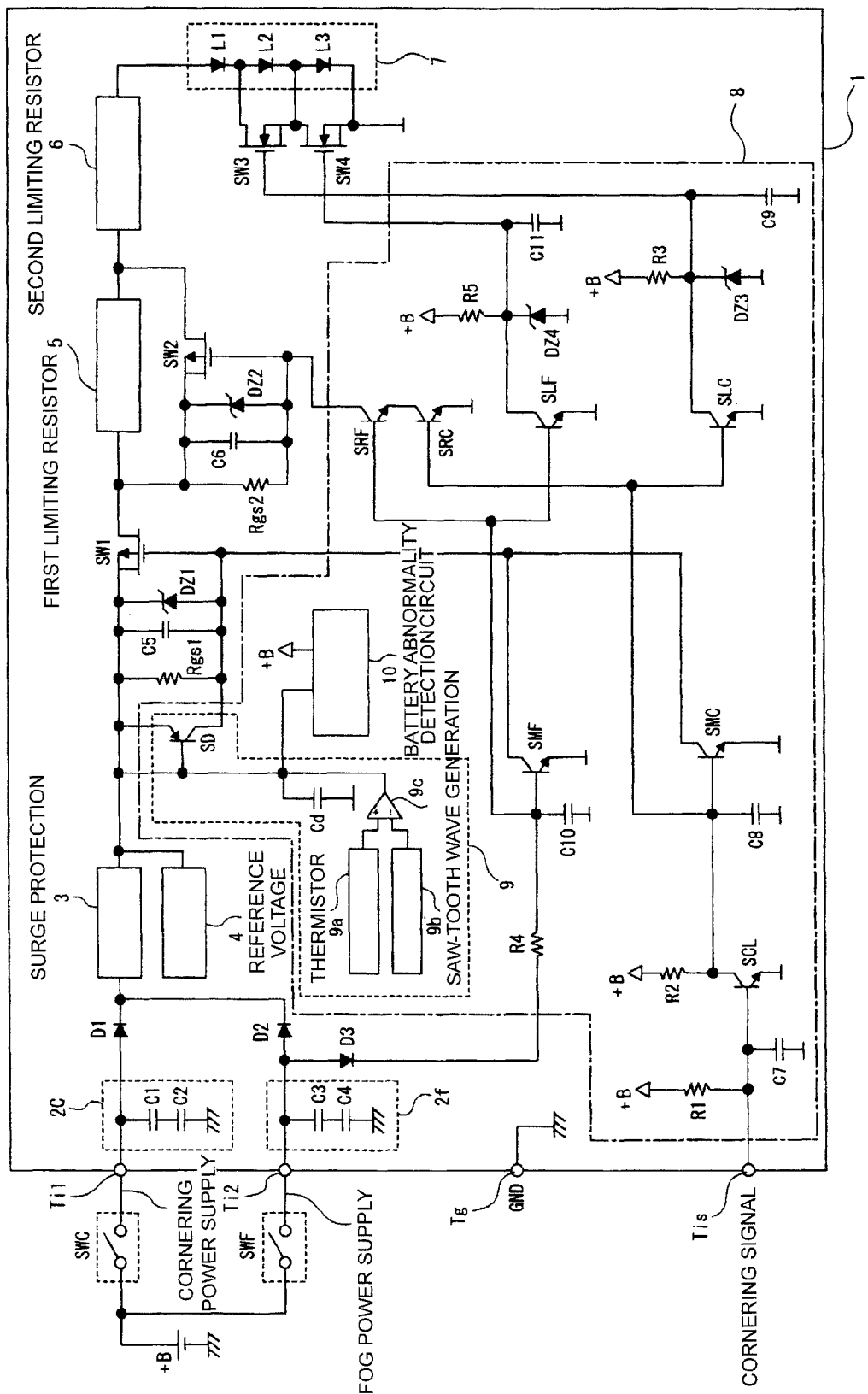
FIG. 1 is a diagram illustrating the circuit configuration of a vehicular lamp according to one or more embodiments of the present invention.

In FIG. 1, the vehicular lamp 1 includes a power supply input terminal Ti1, a power supply input terminal Ti2, a ground (GND) terminal Tg, a signal input terminal Tis, an input filter 2c, an input filter 2f, diodes D1, D2, D3, a surge protection circuit 3, a reference voltage generation circuit 4, a main switch SW1, a Zener diode DZ1, a resister Rgs1, a capacitor C5, a first limiting resistor 5, a second limiting resistor 6, a resistor switching switch SW2, a Zener diode DZ2, a resister Rgs2, a capacitor C6, a light-emitting portion 7, a first bypass switch SW3, a second bypass switch SW4, and a control circuit 8.

The light-emitting portion 7 of the vehicular lamp 1 is a light-emitting portion that lights two kinds of lamps having different functions. Specifically, the light-emitting portion 7 lights a cornering lamp and a fog lamp. The light-emitting portion 7 has a plurality of light-emitting elements L connected in series, and semiconductor light-emitting elements, e.g., light-emitting diodes, are used as the light-emitting elements L. The light-emitting portion 7 has three light-emitting elements L1, L2, L3 as the light-emitting elements L, and these light-emitting elements L1 to L3 light the cornering lamp and the fog lamp. The light-emitting element L1 is a shared element that is used both when lighting the cornering lamp and when lighting the fog lamp. The light-emitting element L2 is a dedicated element for the cornering lamp, and is lit only when lighting the cornering lamp. The light-emitting element L3 is a dedicated element for the fog lamp, and is lit only when lighting the fog lamp.

FIG. 2 shows an example of the light-emitting elements L to be lit in each lighting mode of the light-emitting portion 7. The light-emitting element L1 and the light-emitting element L3 are lit when lighting the fog lamp. The light-emitting element L1 and the light-emitting element L2 are lit when lighting the cornering lamp. All the light-emitting elements L1 to L3 are lit when lighting both the fog lamp and the cornering lamp.

Referring back to FIG. 1, a cornering power supply can be applied from a vehicle via a switch SWC to the power supply input terminal Ti1 as a power supply voltage based on an on-board battery B (e.g., DC 12V). The switch SWC is turned on/off according to, e.g., a lighting/extinguishing operation of a headlamp which is performed on the part of the vehicle. That is, lighting/extinguishing of the cornering lamp does not necessarily match the on/off state of the switch SWC. In the case of this example, a command to light/extinguish (turn on/off) the cornering lamp is sent to the vehicular lamp 1 by a cornering signal that is separately supplied from the vehicle to the signal input terminal Tis.

In the following description, it is assumed that the switch SWC is on when traveling at night etc.

A fog power supply can be applied via a switch SWF to the power supply input terminal Ti2 as a power supply voltage based on the on-board battery B. The switch SWF is turned on/off according to a lighting/extinguishing operation of the fog lamp which is performed on the part of the vehicle. In the case of this example, lighting and extinguishing of the fog lamp can be switched according to application/non-application of the fog power supply to the power supply input terminal Ti2, that is, on/off of the switch SWF according to a lighting/extinguishing operation of the fog lamp.

The ground terminal Tg is grounded.

The input filter 2C has a series connection circuit of a capacitor C1 and a capacitor C2 which are inserted between the power supply input terminal Ti1 and a ground point, and removes noise that is produced in an input line of the cornering power supply. The input filter 2f has a series connection circuit of a capacitor C3 and a capacitor C4 which are inserted between the power supply input terminal Ti2 and the ground point, and removes noise that is produced in an input line of the fog power supply.

An anode of the diode D1 is connected to the connection point of the power supply input terminal Ti1 and the capacitor C1, and an anode of the diode D2 is connected to the connection point of the power supply input terminal Ti2 and the capacitor C3. A cathode of the diode D1 is connected to a cathode of the diode D2. An anode of the diode D3 is connected to the connection point of the power supply input terminal Ti2 and the anode of the diode D2, and a cathode of the diode D3 is connected to the control circuit 8.

The surge protection circuit 3 is connected to the connection point of the cathodes of the diode D1 and the diode D2, and performs a protection operation when a surge voltage is input as the cornering power supply or the fog power supply.

The reference voltage generation circuit 4 generates a reference voltage of a predetermined level (e.g., 10 V) based on an output voltage of the surge protection circuit 3. Although not shown in the figure, the reference voltage is supplied to necessary parts in the vehicular lamp 1.

The main switch SW1 is formed by, e.g., a metal-oxide-semiconductor field-effect transistor (MOSFET), and is provided in order to switch between the state where an input voltage based on the cornering power supply or the fog power supply is applied to the light-emitting portion 7 and the state where the input voltage is not applied to the light-emitting portion 7. In this example, the main switch SW1 is formed by a P-type MOSFET, has its source connected via the surge protection circuit 3 to the connection point of the cathodes of the diode D1 and the diode D2 described above, and has its drain connected to one end of the first limiting resistor 5. The main switch SW1 has its gate connected to the control circuit 8, so that on/off control of the main switch SW1 can be performed by the control circuit 8.

A parallel connection circuit in which the Zener diode DZ1, the capacitor C5, and the resistor Rgs1 are connected in parallel is inserted between the gate and the source of the main switch SW1. A cathode of the Zener diode DZ1 is connected to the source of the main switch SW1, and an anode of the Zener diode DZ1 is connected to the gate of the main switch SW1.

Both the first limiting resistor 5 and the second limiting resistor 6 are current limiting resistors, and are inserted in series between the main switch SW1 and the light-emitting portion 7. The resistor switching switch SW2 is connected in parallel to the first limiting resistor 5. The resistor switching switch SW2 is formed by a P-type MOSFET, has its source connected to the connection point of the one end of the first limiting resistor 5 and the drain of the main switch SW1, and has its drain connected to the connection point of the other end of the first limiting resistor 5 and one end of the second limiting resistor 6. The resistor switching switch SW2 has its gate connected to the control circuit 8, so that on/off control of the resistor switching switch SW2 can also be performed by the control circuit 8.

A parallel connection circuit in which the Zener diode DZ2, the capacitor C6, and the resistor Rgs2 are connected in parallel is inserted between the gate and the source of the resistor switching switch SW2. A cathode of the Zener diode DZ2 is connected to the source of the resistor switching switch SW2, and an anode of the Zener diode DZ2 is connected to the gate of the resistor switching switch SW2.

The light-emitting portion 7 is inserted in series between the other end of the second limiting resistor 6 and the ground. The light-emitting elements L1 to L3 in the light-emitting portion 7 are connected in order of L1, L2, and L3 from the other end of the second limiting resistor 6. The light-emitting elements L1 to L3 are arranged so as to be located next to each other in the lateral direction of the vehicle when the vehicular lamp 1 is attached to the vehicle. The light-emitting element L1 is located outermost as viewed from the lateral center of the vehicle, and the light-emitting element L3 is located closest to the lateral center of the vehicle.

The first bypass switch SW3 is connected in parallel to the light-emitting element L2 as a dedicated element for the cornering lamp, and the second bypass switch SW4 is connected in parallel to the light-emitting element L3 as a dedicated element for the fog lamp. An N-type MOSFET is used for both the first bypass switch SW3 and the second bypass switch SW4. The first bypass switch SW3 has its drain connected to the connection point of a cathode of the light-emitting element L1 and an anode of the light-emitting element L2, and has its source connected to the connection point of a cathode of the light-emitting element L2 and an anode of the light-emitting element L3 and to a drain of the second bypass switch SW4. The second bypass switch SW4 has its source connected to a cathode of the light-emitting element L3.

Both the first bypass switch SW3 and the second bypass switch SW4 have their gates connected to the control circuit 8, so that on/off control of the first bypass switch SW3 and the second bypass switch SW4 is performed by the control circuit 8.

The control circuit 8 has a configuration that performs on/off control of the main switch SW1 and the first bypass switch SW3 so that the cornering lamp is lit/extinguished according to on/off of the cornering signal that is received via the signal input terminal Tis. Specifically, the control circuit 8 has a resistor R1, a capacitor C7, a resistor R2, a switch SCL, a capacitor C8, a switch SMC, a switch SLC, a resistor R3, a Zener diode DZ3, and a capacitor C9.

The switch SCL is formed by, e.g., an NPN-type bipolar transistor, and has its base connected to the signal input terminal Tis. The connection point of the signal input terminal Tis and the base of the switch SCL is connected via the resistor R1 to a positive voltage ("+B" in the figure; hereinafter simply referred to as the "battery voltage") of the on-board battery B. The capacitor C7 is inserted between the connection point of the signal input terminal Tis and the base of the switch SCL and the ground. A collector of the switch SCL is connected via the resistor R2 to the battery voltage, and an emitter of the switch SCL is connected to the ground.

The switch SMC is formed by, e.g., an NPN-type bipolar transistor, and has its base connected to the collector of the switch SCL. The connection point of the base of the switch SMC and the collector of the switch SCL is connected via the capacitor C8 to the ground. A collector of the switch SMC is connected to the gate of the main switch SW1, and an emitter of the switch SMC is connected to the ground.

The switch SLC is formed by, e.g., an NPN-type bipolar transistor, and has its base connected to the connection point of the collector of the switch SCL and the base of the switch SMC. An emitter of the switch SLC is connected to the ground, and a collector thereof is connected to the gate of the first bypass switch SW3. The collector of the switch SLC is also connected via the resistor R3 to the battery voltage. The Zener diode DZ3 is inserted between the resistor R3 and the ground. A cathode of the Zener diode DZ3 is connected to the resistor R3, and an anode of the Zener diode DZ3 is connected to the ground.

The connection point of the connection point of the resistor R3 and the cathode of the Zener diode DZ3 and the gate of the first bypass switch SW3 is connected via the capacitor C9 to the ground.

In the case of this example, the cornering signal is switched to open when sending a command to extinguish the cornering lamp, and is switched to Low (GND) when sending a command to light the cornering lamp. When the cornering signal is switched to open according to a command to extinguish the cornering lamp, a current based on the battery voltage is applied via the resistor R1 to the base of the switch SCL, whereby the switch SCL is turned on. When the switch SCL is on, the current based on the battery voltage flows via the resistor R2 and then via the collector-emitter of the switch SCL to the ground. Accordingly, no base current is supplied to the switch SMC, and the switch SMC is turned off. When the switch SMC is off, no gate voltage is applied to the main switch SW1, and the main switch SW1 is turned off. That is, no driving current flows to the light-emitting portion 7, and the light-emitting elements L1, L2 corresponding to the cornering lamp are extinguished.

When the fog power supply is on (the switch SWF is on), a switch SMF described below is turned on. Accordingly, the main switch SW1 is turned on even if the switch SMC is off as described above (i.e., even if a command to extinguish the cornering lamp has been sent). When the main switch SM1 is thus in the on state according to a command to light the fog lamp, an extinguished state of the cornering lamp is implemented by controlling the first bypass switch SW3 to an on state as described below.

Specifically, if the switch SCL is turned on as described above according to the cornering signal being switched to open, no base current is supplied to the switch SLC, either, and the switch SLC is also turned off. When the switch SLC is off, the capacitor C9 is charged based on the battery voltage connected via the resistor R3 to the capacitor C9, and a gate voltage is applied to the first bypass switch SW3 based on the charge voltage, whereby the first bypass switch SW3 is turned on. As a result, even if the main switch SW1 is on according to a command to light the fog lamp, a driving current is bypassed via the first bypass switch SW3, whereby the light-emitting element L2 is extinguished. That is, the cornering lamp is in an extinguished state.

On the other hand, when the cornering signal is switched to Low according to a command to light the cornering lamp, the switch SCL is turned off, and a current based on the battery voltage flows via the resistor R2 to the base of the switch SMC, whereby the switch SMC is turned on. Since the switch SMC is on, a gate voltage is applied to the main switch SW1, whereby the main switch SW1 is turned on.

When the switch SCL is turned off as described above, a base current is also applied via the resistor R2 to the switch SLC as well, whereby the switch SLC is turned on, and a current based on the battery voltage flows via the resistor R3 and then via the collector-emitter of the switch SLC. Accordingly, the capacitor C9 is not charged, and no gate voltage is applied to the first bypass switch SW3. That is, the first bypass switch SW3 is turned off.

As described above, in response to a command to light the cornering lamp, the main switch SW1 is turned on, and the first bypass switch SW3 is turned off. A driving current is thus supplied to the light-emitting portion 7, and is not bypassed via the first bypass switch SW3. Accordingly, the light-emitting element L1 and the light-emitting element L2 which correspond to the cornering lamp are lit.

The control circuit 8 has a configuration that performs on/off control of the main switch SW1 and the second bypass switch SW4 in order to light/extinguish the fog lamp according to on/off of the fog power supply that is applied to the power supply input terminal Ti2. That is, the control circuit 8 has a resistor R4, a capacitor C10, the switch SMF, a switch SLF, a resistor R5, a Zener diode DZ4, and a capacitor C11.

The switch SMF is formed by, e.g., an NPN-type bipolar transistor, and has its base connected via the resistor R4 to the cathode of the diode D3 described above. An emitter of the switch SMF is connected to the ground, and a collector of the switch SMF is connected to the gate of the main switch SW1.

The capacitor C10 is inserted between the base of the switch SMF and the ground.

The switch SLF is formed by, e.g., an NPN-type bipolar transistor, and has its base connected to the connection point of the base of the switch SMF and the capacitor C10. An emitter of the switch SLF is connected to the ground, and a collector of the switch SLF is connected to the gate of the second bypass switch SW4.

The collector of the switch SLF is connected via the resistor R5 to the battery voltage. The Zener diode DZ4 is inserted between the resistor R5 and the ground. A cathode of the Zener diode DZ4 is connected to the resistor R5, and an anode of the Zener diode DZ4 is connected to the ground. The connection point of the connection point of the resistor R5 and the cathode of the Zener diode DZ4 and the gate of the second bypass switch SW4 is connected via the capacitor C11 to the ground.

As described above, the fog power supply is turned on/off according to on/off of the switch SWF in response to a lighting/extinguishing operation of the fog lamp. When the switch SWF is off according to an extinguishing operation of the fog lamp, the switch SMF is off, and no gate voltage is applied to the main switch SW1. Accordingly, if the cornering lamp is also in an extinguished state (that is, if the switch SMC described above is also off), the switch SW1 is turned off, and the light-emitting element L1 and the light-emitting element L3 which correspond to the fog lamp are extinguished.

The switch SLF is turned off when the switch SWF is off. The capacitor C11 is thus charged based on the battery voltage connected via the resistor R5 to the capacitor 11, and a gate voltage based on the charge voltage of the capacitor C11 is applied to the second bypass switch SW4. The second bypass switch SW4 is thus turned on, and a driving current is bypassed via the second bypass switch SW4 even if the main switch SW1 is on due to the control for the cornering lamp. The light-emitting element L3 is thus extinguished. That is, the fog lamp is extinguished.

On the other hand, when the fog power supply is turned on, both the switch SMF and the switch SLF are turned on. As the switch SMF is turned on, the main switch SW1 is turned on, and a driving current flows in the light-emitting portion 7.

As the switch SLF is turned on, a current based on the battery voltage flows via the resistor R5 and then via the collector-emitter of the switch SLF. The capacitor C11 is therefore not charged, and the second bypass switch SW4 is thus turned off That is, a driving current is not bypassed via the second bypass switch SW4, and flows in the light-emitting element L3.

As a result, when the fog power supply is turned on, the light-emitting element L1 and the light-emitting element L3 which correspond to the fog lamp are lit.

As described above, one or more embodiments of the present invention uses a configuration in which the bypass switch connected in parallel to a required light-emitting element L in the light-emitting portion 7 is turned on/off to independently turn on/off the light-emitting elements L to which the bypass switch is connected. In the case of using such a configuration, a current value of the driving current in the light-emitting portion 7 varies between when the bypass switch is on and when the bypass switch is off as described above, and the amount of light emission of the light-emitting elements L varies between when the bypass switch is on and when the bypass switch is off.

In the case of this example, the number of light-emitting elements L that are lit when lighting only the cornering lamp is "2," which is the same as the number of light-emitting elements L that are lit when lighting only the fog lamp. The number of light-emitting elements L that are lit when lighting both the cornering lamp and the fog lamp is "3." Accordingly, such a difference in amount of light emission as described above is produced between when only the cornering lamp or the fog lamp is lit and when both the cornering lamp and the fog lamp are lit.

According to one or more embodiments of the present invention, the first limiting resistor 5 and the second limiting resistor 6 are provided as the current limiting resistors for the driving current, the resistor switching switch SW2 is connected in parallel to the first limiting resistor 5, and the resistor switching switch SW2 is turned on/off in synchronization with on/off switching of the bypass switch.

The control circuit 8 includes a switch SRC and a switch SRF in order to perform such on/off switching of the resistor switching switch SW2. Each of the switch SRC and the switch SRF is formed by, e.g., an NPN-type bipolar transistor. A collector of the switch SRF is connected to the gate of the resistor switching switch SW2, and an emitter of the switch SRF is connected to a collector of the switch SRC. An emitter of the switch SRC is connected to the ground.

A base of the switch SRC is connected to the connection point of the base of the switch SMC and the capacitor C8 described above. A base of the switch SRF is connected to the connection point of the base of the switch SFM and the capacitor C10 described above.

According to the above configuration, no gate voltage is applied to the resistor switching switch SW2 unless both the switch SRC and the switch SRF are turned on. That is, the resistor switching switch SW2 is turned on when both the switch SRC and the switch SRF are turned on.

The switch SRC is turned on when the cornering switch is low (a command to light the cornering lamp is sent) and the switch SCL is thus turned off and a base current based on the battery voltage connected via the resistor R2 to the switch SMC is applied to the switch SMC. The switch SRF is turned on when the switch SWF is turned on and a base current based on the fog power supply is applied to the switch SRF. That is, both the switch SRC and the switch SRF are turned on when a command to light both the cornering lamp and the fog lamp is sent.

When both the switch SRC and the switch SRF are turned on and the resistor switching switch SW2 is turned on, a current flowing from the main switch SW1 side is bypassed via the resistor switching switch SW2. Accordingly, only the second limiting resistor 6 is effective as the current limiting resistor.

On the other hand, when either a command to extinguish the cornering lamp or a command to extinguish the fog lamp is sent, that is, when the cornering signal is switched to open or the switch SWF is turned off, either the switch SRC or the switch SRF is turned off, and the resistor switching switch SW2 is therefore turned off. A current flowing from the main switch SW1 side thus flows to the second limiting resistor 6 via the first limiting resistor 5. Accordingly, the first limiting resistor 5 and the second limiting resistor 6 are effective as the current limiting resistors. That is, the resistance value to the driving current is increased as compared to the case of lighting both the cornering lamp and the fog lamp.

Such switching of the resistance value prevents the current value of the driving current from varying according to on/off of the bypass switch connected in parallel to the light-emitting element L2 or the light-emitting element L3.

For clarification, FIG. 3 shows the on/off control state of the main switch SW1, the resistor switching switch SW2, the first bypass switch SW3, and the second bypass switch SW4 in each lighting mode of the light-emitting portion 7. As shown in the figure, all of the main switch SW1, the resistor switching switch SW2, the first bypass switch SW3, and the second bypass switch SW4 are turned off in an all off mode in which both the cornering lamp and the fog lamp are extinguished. Only the main switch SW1 and the first bypass switch SW3 are turned on and the other switches SW are turned off when lighting only the fog lamp. Only the main switch SW1 and the second bypass switch SW4 are turned on and the other switches SW are turned off when lighting only the cornering lamp. The main switch SW1 and the resistor switching switch SW2 are turned on and the first bypass switch SW3 and the second bypass switch SW4 are turned off when lighting both the fog lamp and the cornering lamp.

The control circuit 8 of this example further has a temperature derating portion 9 and a battery abnormality detection circuit 10 in addition to the configuration that prevents such a variation in driving current value as described above.

The temperature derating portion 9 has a thermistor 9a, a saw-tooth wave generation circuit 9b, a comparator 9c, a capacitor Cd, and a switch SD, and implements temperature derating by driving the main switch SW1 by pulse width modulation (PWM) based on the temperature detection result from the thermistor 9a. In the temperature derating portion 9, a temperature detection signal from the thermistor 9a is applied to a positive terminal of the comparator 9c, and a saw-tooth wave signal of a constant frequency generated by the saw-tooth wave generation circuit 9b is applied to a negative terminal of the comparator 9c.

Figure 4:
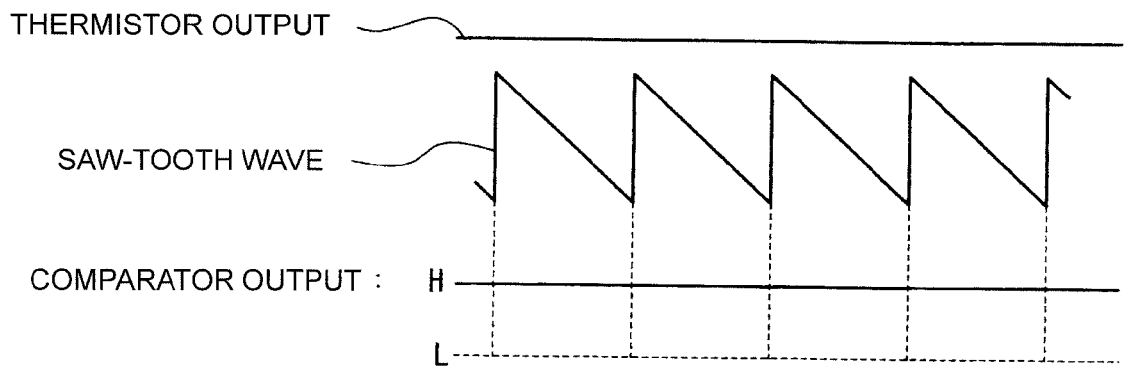
FIG. 4 shows diagrams showing the relations among a saw-tooth wave signal, a thermistor output, and a comparator output in a temperature derating portion at different temperatures.
Figure 4:
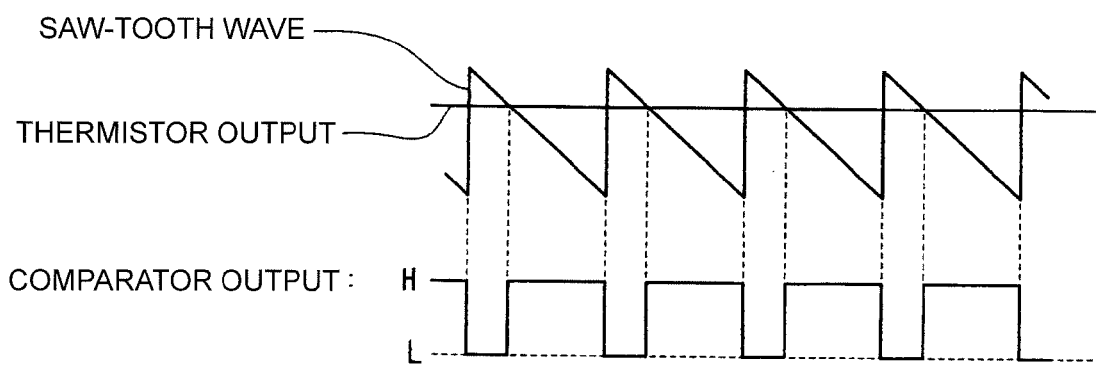
Figure 4:
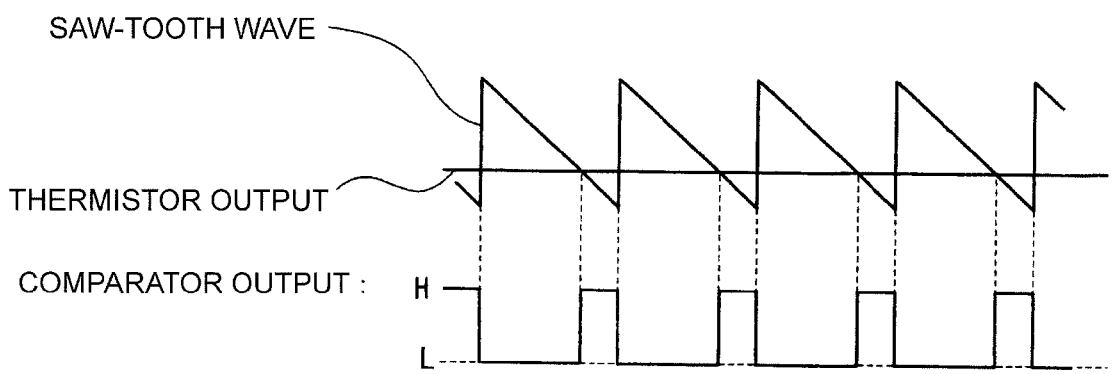

FIG. 4 exemplarily shows the relations among the temperature detection signal that is output from the thermistor 9a ("thermistor output" in the figure), the saw-tooth wave signal that is generated by the saw-tooth wave generation circuit 9b, and the output signal of the comparator 9c. The upper chart in FIG. 4 shows a state where the temperature is relatively low, the middle chart in FIG. 4 shows a state where the temperature is higher than that in the upper chart, and the lower chart shows a state where the temperature is higher than that in the middle chart. In the case of this example, the thermistor 9a reduces the level of the temperature detection signal with an increase in temperature. Accordingly, as the temperature increases, the High-level period of the output signal of the comparator 9c decreases and the Low-level period of the output signal of the comparator 9c increases, as shown in the figure.

Referring back to FIG. 1, the switch SD is formed by, e.g., a PNP-type bipolar transistor, and a base of the switch SD is connected to an output terminal of the comparator 9c. The base of the switch SD is also connected to the connection point of the surge protection circuit 3 and the reference voltage generation circuit 4. Moreover, the base of the switch SD is also connected to the ground via the capacitor Cd.

An emitter of the switch SD is connected to the source of the main switch SW1, and a collector of the switch SD is connected to the gate of the main switch SW1.

When the output signal of the comparator 9c is at Low level, the switch SD is turned on, whereby the gate and the source of the main switch SW1 are short-circuited, and the main switch SW1 is therefore forcibly turned off. That is, the main switch SW1 is turned off regardless of the control of the main switch SW1 based on the cornering signal or the fog power supply described above.

On the other hand, when the output signal of the comparator 9c is at High level, the switch SD is turned off. Accordingly, the main switch SW1 is kept in the on state if the main switch SW1 is on by the control based on the cornering signal or the fog power supply.

As described above, the Low level period of the output signal of the comparator 9c increases with an increase in temperature. Accordingly, as the temperature increases, the duty ratio of the switch SD increases and the duty ratio of the main switch SW1 decreases accordingly. That is, an average current value of the driving current is suppressed with an increase in temperature. Temperature derating is thus implemented which prevents reduction in life of the light-emitting elements L1 to L3 and breakdown thereof associated with an increase in temperature.

In the control circuit 8, the battery abnormality detection circuit 10 detects a voltage value of the battery voltage. If the detected voltage value is out of a predetermined range, the battery abnormality detection circuit 10 forcibly turns on the switch SD. That is, the battery abnormality detection circuit 10 forcibly turns off the main switch SW1.

The light-emitting portion 7 can thus be forcibly turned off both in the case where an input voltage to the vehicular lamp 1 based on the on-board battery is abnormally high and in the case where this input voltage is abnormally low, and circuit breakdown and reduction in life associated with the abnormal input voltage can be prevented.

As described above, the vehicular lamp 1 according to one or more embodiments of the present invention includes: the light-emitting portion 7 connected in series to the input terminal (the power supply input terminals Ti1, Ti2) to which a power supply voltage based on the on-board battery B is applied, and having the plurality of light-emitting elements L1 to L3 connected in series; a series connection circuit of the first limiting resistor 5 and the second limiting resistor 6, which is inserted in series between the input terminal and the light-emitting portion 7; the resistor switching switch SW2 connected in parallel to one of the first limiting resistor 5 and the second limiting resistor 6; the bypass switches (the first bypass switch SW3 and the second bypass switch SW4) each connected in parallel to a required one L of the light-emitting elements L1 to L3 in the light-emitting portion 7; and the control circuit 8 that turns off the resistor switching switch SW2 when at least one of the bypass switches is turned on.

Accordingly, a resistance value to the driving current increases in the case where the bypass switch is turned on and current consumption of the light-emitting portion 7 decreases. A constant amount of light emission of the light-emitting elements L can therefore be maintained regardless of on/off of the bypass switches.

In order to maintain a constant amount of light emission of the light-emitting elements L, one or more embodiments of the present invention uses a configuration in which a resistance value of the current limiting resistor to the driving current is switched according to on/off switching of the bypass switches. The vehicular lamp 1 therefore need not include a DC-to-DC converter and a feedback control circuit which perform constant current control of the driving current. According to one or more embodiments of the present invention, the vehicular lamp capable of maintaining a constant amount of light emission of the light-emitting elements L regardless of on/off of the bypass switches can thus be implemented while achieving reduction in cost.

In the vehicular lamp 1 according to one or more embodiments of the present invention, the light-emitting portion 7 is a light-emitting portion 7 that lights both of the two kinds of lamps having different functions, and has three of the light-emitting elements L, one of the three light-emitting elements L being a shared element that is lit when lighting the lamps of each function, and the other two being dedicated elements each of which is lit only when lighting the lamp of a corresponding one of the functions. The first bypass switch SW3 and the second bypass switch SW4 are provided as the bypass switches, the first bypass switch SW3 being connected in parallel to one of the dedicated elements (the light-emitting element L2), and the second bypass switch SW4 being connected in parallel to the other dedicated element (the light-emitting element L3). Moreover, the control circuit 8 turns off the resistor switching switch SW3 when both the first bypass switch SW3 and the second bypass switch SW4 are turned on.

As described above, the light-emitting portion 7 is the light-emitting portion for both of the two kinds of lamps having different functions, and the bypass switches are connected in parallel to the dedicated elements other than the shared element, respectively. Accordingly, separate driving circuits that independently supply the driving current need not be provided for the lamps of each function in order to independently control lighting/extinguishing of the two kinds of lamps having different functions. This can simplify the circuit configuration and can achieve reduction in cost.

The resistor switching switch is turned off when both the first bypass switch SW3 and the second bypass switch SW4 are turned on. The resistance vale to the driving current is thus increased in the case where current consumption of the light-emitting portion 7 decreases. A constant amount of light emission of the light-emitting elements L can therefore be maintained regardless of on/off of the bypass switches.

The vehicular lamp 1 according to one or more embodiments of the present invention further includes: the main switch SW1 inserted in series between the input terminal and the light-emitting portion 7, and the control circuit 8 has the temperature derating portion 9 that drives the main switch SW1 by PWM based on a temperature detection result.

Temperature derating is thus implemented in a simple configuration in which a switching regulator that generates an output voltage to the light-emitting portion 7 based on the power supply voltage is omitted.

Such a switching regulator (14) as described in, e.g., Patent Document 1 may be provided in order to drive the light-emitting portion 7 based on the power supply voltage. In this case, temperature derating is typically implemented by controlling a switching operation of the switching regulator. However, since the switching regulator has a relatively large number of parts, the circuit configuration is complicated, causing an increase in cost.

On the other hand, according to one or more embodiments of the present invention, temperature derating is implemented by driving the main switch SW1 inserted in series between the input terminal and the light-emitting portion 7 by PWM, without providing any switching regulator. This can simplify the circuit configuration that implements temperature derating, and can achieve reduction in cost.

Moreover, in the vehicular lamp 1 according to one or more embodiments of the present invention, the control circuit 8 controls, based on an input to a power supply line (the input line of the fog power supply) to which the power supply voltage is supplied when lighting one of the two kinds of lamps having the different functions, the bypass switch (the second bypass switch SW4) connected in parallel to the dedicated element for the one lamp and the resistor switching switch SW2.

Accordingly, for the one lamp, a control signal as a lighting/extinguishing command need not be input separately from the power supply voltage like, e.g., for the cornering lamp.

This can reduce the number of input lines for the one lamp which are required to perform lighting/extinguishing control of the dedicated element.

Moreover, a signal as a command to turn on/off the dedicated element need not be separately generated on the part of the vehicle. This can simplify the circuit configuration for the vehicle and can achieve reduction in cost.

In addition, in the vehicular lamp 1 according to one or more embodiments of the present invention, one of the two kinds of lamps having the different functions is a fog lamp, the other is a cornering lamp, and the light-emitting elements L1 to L3 are semiconductor light-emitting elements.

Control of increasing the resistance value to the driving current when the bypass switch is turned on is thus implemented in the vehicular lamp capable of independently controlling lighting/extinguishing of the fog lamp and the cornering lamp by on/off of the bypass switches. Moreover, the semiconductor light-emitting elements such as, e.g., light-emitting diodes are used as the light-emitting elements L. This is advantageous for reducing the mounting size of the light-emitting elements L.

Accordingly, in the vehicular lamp capable of independently controlling lighting/extinguishing of the fog lamp and the cornering lamp, a constant amount of light emission of the light-emitting elements L can be maintained regardless of on/off of the bypass switches, and design flexibility of the vehicular lamp can be improved.

The present invention is not limited to the specific examples described above. For example, one or more embodiments of the present invention is described above with respect to the case where the light-emitting portion 7 is a light-emitting portion for both of the two lamps having different functions. However, one or more embodiments of the present invention is widely applicable to vehicular lamps in which each of the bypass switches is connected in parallel to a required one L of the light-emitting elements L in the light-emitting portion 7 so that lighting/extinguishing of the light-emitting element L to which the bypass switch is connected in parallel can be independently controlled.

One or more embodiments of the present invention is described above with respect to the case where the semiconductor light-emitting elements are used as the light-emitting elements L. However, the light-emitting elements are not limited to the semiconductor light-emitting elements. Moreover, the number of light-emitting elements L in the light-emitting portion 7 is not limited to three, and may be two or four or more.

One or more embodiments of the present invention is described above with respect to the configuration in which the two current limiting resistors are provided for the case where the driving current value can switch between two stages according to on/off of the bypass switches, the resistor switching switch is connected in parallel to one of the two current limiting resistors, and the resistor switching switch is turned on/off according to on/off switching of the bypass switches. However, in the case where the driving current value can switch among three stages or more according to on/off of the bypass switches depending on, e.g., the number of light-emitting elements L in the light-emitting portion 7, the number of bypass switches, etc., three or more current limiting resistors are provided, resistor switching switches are respectively connected in parallel to two or more of the current limiting resistors, and these resistor switching switches are turned on/off in synchronization with on/off switching of the bypass switches. In this case, on/off control of the resistor switching switches is performed so that the number of resistor switching switches to be turned off is increased as the number of bypass switches to be turned on is increased.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF THE REFERENCE NUMERALS

1 VEHICULAR LAMP
Ti1, Ti2 POWER SUPPLY INPUT TERMINAL
SW1 MAIN SWITCH
SW2 RESISTOR SWITCHING SWITCH
SW3 FIRST BYPASS SWITCH
SW4 SECOND BYPASS SWITCH
5 FIRST LIMITING RESISTOR
6 SECOND LIMITING RESISTOR
7 LIGHT-EMITTING PORTION
L1 TO L3 LIGHT-EMITTING ELEMENT
8 CONTROL CIRCUIT
9 TEMPERATURE DERATING PORTION

The invention claimed is:
1. A vehicular lamp, comprising:
a light-emitting portion connected in series to an input terminal to which a power supply voltage based on an on-board battery is configured to be applied, and comprising a plurality of light-emitting elements connected in series;
a series connection circuit comprising a first current limiting resistor and a second current limiting resistor, which is inserted in series between the input terminal and the light-emitting portion;
a resistor switching switch connected in parallel to one of the first current limiting resistor and the second current limiting resistor;
bypass switches, each of which is connected in parallel to a required one of the light-emitting elements in the light-emitting portion; and
a control circuit that turns off the resistor switching switch when at least one of the bypass switches is turned on.
2. The vehicular lamp according to claim 1,
wherein the light-emitting portion lights both of two kinds of lamps having different functions, and has three of the light-emitting elements,
wherein one of the three light-emitting elements is a shared element that is lit when lighting the lamps of each function, and the other two of the light-emitting elements are dedicated elements each of which is lit only when lighting the lamp of a corresponding one of the functions,
wherein a first bypass switch and a second bypass switch are provided as the bypass switches,
wherein the first bypass switch is connected in parallel to one of the dedicated elements,
wherein the second bypass switch is connected in parallel to the other dedicated element, and
wherein the control circuit turns off the resistor switching switch when both the first bypass switch and the second bypass switch are turned on.
3. The vehicular lamp according to claim 1, further comprising:
a main switch inserted in series between the input terminal and the light-emitting portion,
wherein the control circuit has a temperature derating portion that drives the main switch by PWM based on a temperature detection result.
4. The vehicular lamp according to claim 2,
wherein the control circuit controls, based on an input to a power supply line to which the power supply voltage is supplied when lighting one of the two kinds of lamps having the different functions, the bypass switch connected in parallel to the dedicated element for the one lamp and the resistor switching switch.

5. The vehicular lamp according to claim 2,
wherein one of the two kinds of lamps having the different functions is a fog lamp, and the other is a cornering lamp, and
wherein the light-emitting elements are semiconductor light-emitting elements.

6. The vehicular lamp according to claim 2, further comprising:
a main switch inserted in series between the input terminal and the light-emitting portion,
wherein the control circuit has a temperature derating portion that drives the main switch by PWM based on a temperature detection result.

7. The vehicular lamp according to claim 3,
wherein the control circuit controls, based on an input to a power supply line to which the power supply voltage is supplied when lighting one of the two kinds of lamps having the different functions, the bypass switch connected in parallel to the dedicated element for the one lamp and the resistor switching switch.

8. The vehicular lamp according to claim 3,
wherein one of the two kinds of lamps having the different functions is a fog lamp, and the other is a cornering lamp, and
wherein the light-emitting elements are semiconductor light-emitting elements.

9. The vehicular lamp according to claim 4,
wherein one of the two kinds of lamps having the different functions is a fog lamp, and the other is a cornering lamp, and
wherein the light-emitting elements are semiconductor light-emitting elements.

* * * * *